M. E. ANDERSON.
WAGON SCALE.
APPLICATION FILED NOV. 30, 1914.
1,169,109.
Patented Jan. 25, 1916.
2 SHEETS—SHEET 2.
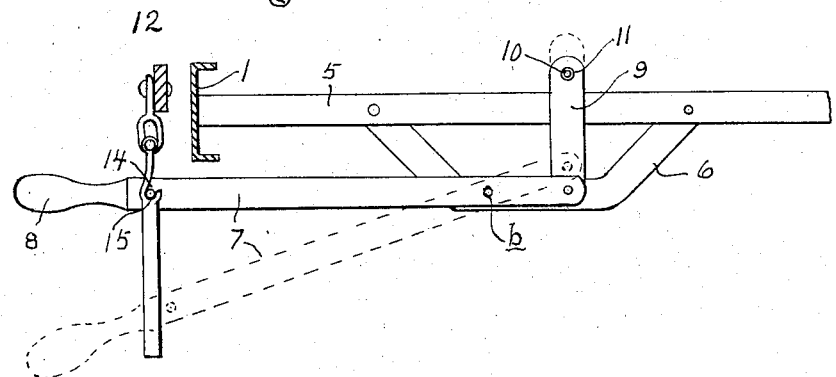
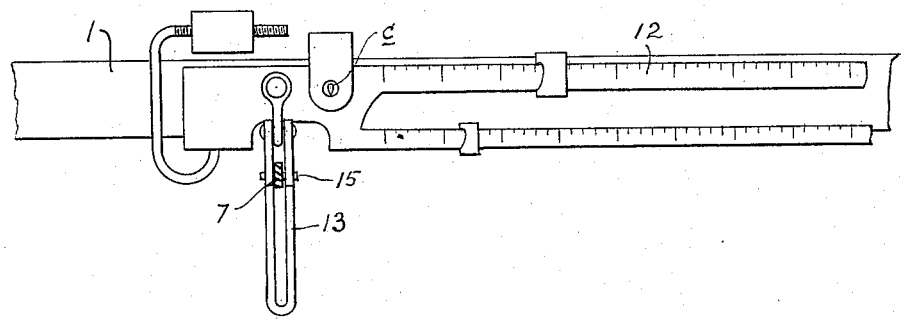
Witnesses
Frank W. Haskell
Chas. H. Woodburn
Inventor
Martin E. Anderson,
By Walter N. Haskell,
his Attorney

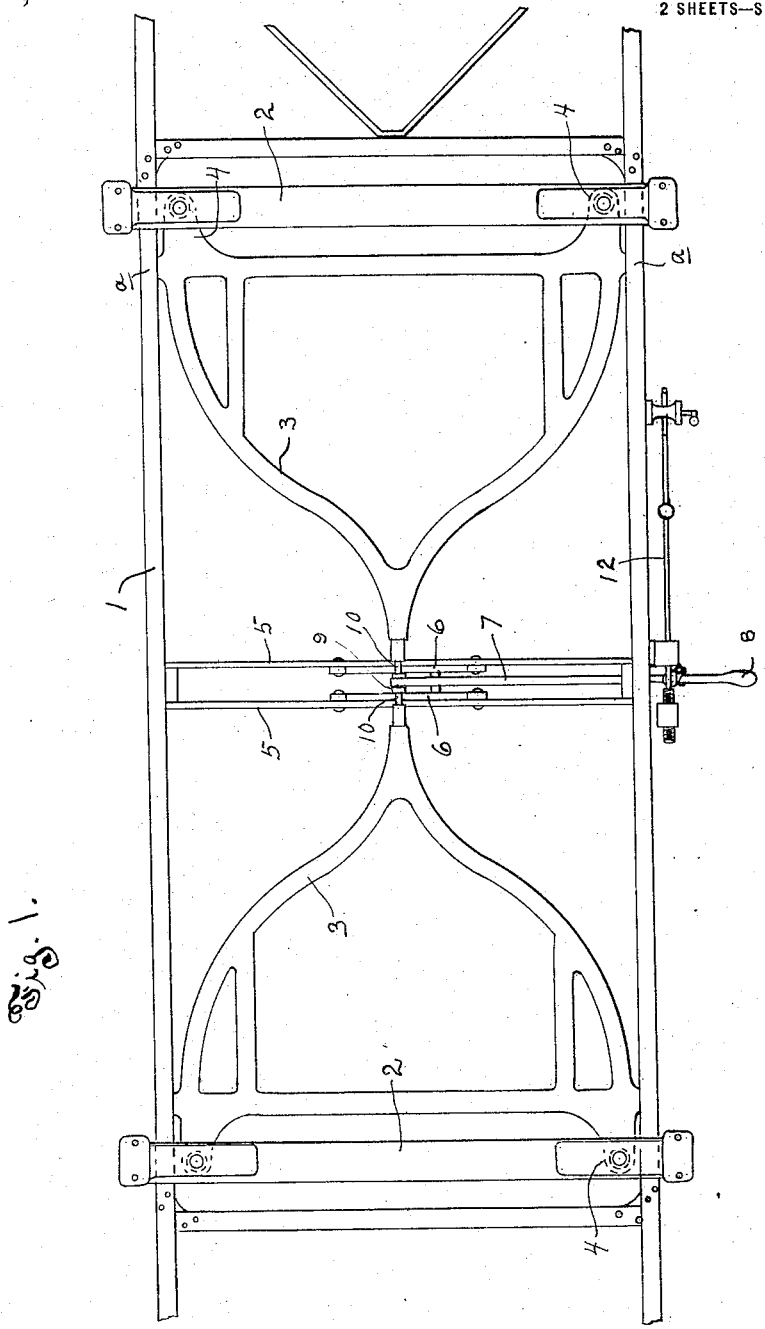

UNITED STATES PATENT OFFICE.

MARTIN E. ANDERSON, OF DE KALB, ILLINOIS, ASSIGNOR TO JACOB HAISH COMPANY, OF DE KALB, ILLINOIS.

WAGON-SCALE.

1,169,109.  Specification of Letters Patent.  Patented Jan. 25, 1916.

Application filed November 30, 1914. Serial No. 874,585.

*To all whom it may concern:*

Be it known that I, MARTIN E. ANDERSON, a citizen of the United States, residing at De Kalb, in the county of Dekalb and State of Illinois, have invented certain new and useful Improvements in Wagon-Scales, of which the following is a specification.

My invention has reference to wagon scales, and relates more specially to novel mechanism by means of which the weight of the load, which is under normal conditions carried by the main frame of the machine, is transferred to the weighing devices, to be suitably indicated thereby.

In the drawings, Figure 1 is a plan view of my invention. Fig. 2 is an enlarged detail of the lever 8 and connecting mechanism at one side thereof. Fig. 3 is a detail of the scale mechanism, in side elevation.

I represents the frame of the machine, which may be portably supported in the manner shown in companion application filed by said Martin E. Anderson on the twentieth day of November, 1914, for improvements in wagon scales, Serial No. 873,229. The load is normally supported by means of bolsters 2, resting at their ends on the side-pieces of the frame 1. Pivoted in the sides of the frame 1, as at *a*, is a pair of lever-frames 3, having short outer arms 4 adapted to be operatively connected with the bolsters 2.

Fixed to the side-pieces of the frame 1, centrally thereof, is a pair of bars 5, secured to which is a pair of brackets 6, between which is fulcrumed a lever 7 as at *b*, projected outwardly beyond the frame 1 and provided with a handle 8. The short end of the lever 7 is connected by means of a pair of links 9 with the ends 10 of said frame levers 3, such ends being reduced so as to engage perforations 11 in the upper ends of said links.

Fulcrumed on the side of the frame 1, as at *c*, is a scale-beam 12, depending from which is a guide-frame 13, in which the outer end of the lever 7 can be moved up or down. The frame 13 is provided with a pair of recesses 14, with which the lever 7 is operatively connected by means of a pin 15 fixed in the lever 7 and projecting beyond each side thereof. When the outer end of the lever 7 is forced upwardly it results in a downward movement of the inner ends of the levers 3 and an upward movement of the short ends 4 thereof, sufficiently to elevate the bolsters 2 a short distance above the frame 1. The load carried by such bolsters is thereby transferred from the frame 1 to the lever frames 3, and is imparted through the lever 7 to the weighing devices, whereby it can be properly indicated, the lever and scale being connected up as shown in Fig. 2. After the load is weighed the lever 7 is raised sufficiently to permit a release of the pin 15 from the recesses 14, and the lever lowered into the position shown in broken lanes. The downward movement thereof is limited by the frame 13. When in the latter position the inner ends of the frames 3 are again raised and the outer ends lowered, permitting the bolsters 2 to again rest upon the frame 1.

The ratio of length of the long and short arms of the frames 3 is approximately 10 of the long arm to 1 of the short arm, and the proportions of the long and short arms of the lever 7 are about the same, so that an upward lift of thirty pounds on the handle 9 will be sufficient to raise a load of three thousand pounds on the short arms 4. All of the pivotal points are preferably provided with knife-edge bearings, so as to reduce the friction to a minimum.

There has been shown and described herein the preferred form of my invention, but variations and modifications can be made therein without departing from the spirit of the invention.

What I claim as my invention, and desire to secure by Letters Patent of the United States, is:

1. A wagon scale, comprising a suitably mounted frame; load-carrying means normally supported thereon; a pair of frame levers fulcrumed in said frame, adapted to engage said load-supporting mechanism at their outer ends, and having their inner ends in proximity at a central point; a hand-lever connected with the inner ends of said frame-levers; weighing devices mounted on said frame; and means for detachably connecting the outer end of said hand-lever with said weighing devices to impart the weight of the load thereto.

2. A wagon scale, comprising a suitably mounted frame; load-carrying devices normally supported thereon; frame-levers fulcrumed in said frame, adapted to coöperate with said load-carrying devices at their short ends; a hand-lever operatively connected with said frame-levers; weighing devices mounted on said frame; and a frame depending from said weighing devices and provided with means for holding said weighing devices in operative connection with said hand-lever when said frame-levers are in engagement with said load-carrying devices, to hold the same in elevated position.

3. A wagon scale, comprising a portable frame; load-carrying devices normally mounted thereon; frame-levers fulcrumed in said frame, adapted to coöperate with said load-bearing devices at their outer ends, and having their inner ends in proximity at a central point; a hand-lever fulcrumed centrally of said main frame and operatively connected with said frame-levers; a scale-beam fulcrumed on the side of said frame; and a frame depending from the short arm of said scale-beam and adapted to coöperate with said hand-lever when such hand-lever is in an operative position to cause a raising of the load above said main frame.

In testimony whereof I affix my signature in presence of two witnesses.

MARTIN E. ANDERSON.

Witnesses:
E. H. BURR,
ERNST F. COLLIN.

Copies of this patent may be obtained for five cents each, by addressing the "Commissioner of Patents, Washington, D. C."